United States Patent
Meyers

(10) Patent No.: US 8,733,482 B2
(45) Date of Patent: May 27, 2014

(54) MOTOR ASSEMBLY FOR TWO WHEELED VEHICLE

(75) Inventor: Eric Vaughn Meyers, Portland, OR (US)

(73) Assignee: BOXX Corp., Portland, OR (US)

( * ) Notice: Subject to any disclaimer, the term of this patent is extended or adjusted under 35 U.S.C. 154(b) by 460 days.

(21) Appl. No.: 13/042,898

(22) Filed: Mar. 8, 2011

(65) Prior Publication Data
US 2011/0291462 A1 Dec. 1, 2011

Related U.S. Application Data

(60) Provisional application No. 61/349,015, filed on May 27, 2010.

(51) Int. Cl.
*B60K 1/00* (2006.01)

(52) U.S. Cl.
USPC .............................................. 180/65.51

(58) Field of Classification Search
USPC .............................. 180/65.51, 220
See application file for complete search history.

(56) References Cited

U.S. PATENT DOCUMENTS

| | | | |
|---|---|---|---|
| 1,924,363 A | 8/1933 | Kanai | |
| D92,777 S | 7/1934 | Stutsman et al. | |
| D144,077 S | 3/1946 | Shaffer | |
| D195,075 S | 4/1963 | May | |
| 3,096,841 A | 7/1963 | May | |
| 3,316,993 A | 5/1967 | Weitzner | |
| D231,441 S | 4/1974 | Tratner | |
| 3,934,669 A | 1/1976 | Adams | |
| D245,324 S | 8/1977 | Adams | |
| 4,094,374 A * | 6/1978 | Adams | 180/208 |
| 4,702,340 A | 10/1987 | Hamilton | |
| 4,895,385 A | 1/1990 | Becoat | |
| 5,004,258 A | 4/1991 | Becoat | |
| 5,054,572 A | 10/1991 | Parker | |
| D323,306 S | 1/1992 | Brummer | |
| 5,097,922 A | 3/1992 | Stagi | |
| 5,113,964 A | 5/1992 | Yamauchi | |
| 5,116,070 A | 5/1992 | Becoat | |
| 5,894,902 A * | 4/1999 | Cho | 180/65.51 |
| 5,894,903 A | 4/1999 | Hieble | |
| 6,273,442 B1 | 8/2001 | Fallon et al. | |
| 6,320,336 B1 | 11/2001 | Eguchi | |
| 6,355,996 B1 * | 3/2002 | Birkestrand | 310/54 |
| 6,439,592 B1 | 8/2002 | Christini et al. | |
| 6,457,544 B1 | 10/2002 | Sung | |
| 6,505,699 B1 | 1/2003 | Christini et al. | |

(Continued)

OTHER PUBLICATIONS

BMW previews its vision of a safer city scooter with C1-E concept—Autoblog, http://www.autoblog.com/2009/10/06/bmw-previews-its-vision-of-a-safer-city-scooter-with-c1-e- . . . , 20 pages, accessed on Jul. 15, 2010.

(Continued)

*Primary Examiner* — Jeffrey J Restifo

(74) *Attorney, Agent, or Firm* — Plumsea Law Group, LLC

(57) ABSTRACT

A wheel assembly includes a tire and an electrical motor having a stator and a rotor. The wheel assembly also includes a rim that is encircled by the tire. At least one of the stator and rotor is directly exposed to the rim. Both the stator and the rotor are housed by the rim. The electrical motor is operable to drivingly rotate the rim and the tire.

20 Claims, 7 Drawing Sheets

(56) References Cited

U.S. PATENT DOCUMENTS

| | | | |
|---|---|---|---|
| 6,892,841 B2 * | 5/2005 | Makuta et al. | 180/65.51 |
| 7,017,694 B2 * | 3/2006 | Shirazawa | 180/65.51 |
| 7,249,644 B2 * | 7/2007 | Honda et al. | 180/65.51 |
| 7,328,766 B2 | 2/2008 | Christini et al. | |
| 7,487,854 B2 | 2/2009 | Christini et al. | |
| 7,717,203 B2 * | 5/2010 | Yoshino et al. | 180/65.51 |
| 8,186,467 B2 * | 5/2012 | Yoshino et al. | 180/65.51 |
| 8,360,188 B2 * | 1/2013 | Yonehana et al. | 180/220 |
| 8,376,072 B2 * | 2/2013 | Sagara et al. | 180/65.51 |
| 8,403,087 B2 * | 3/2013 | Park et al. | 180/65.51 |
| 8,413,748 B2 * | 4/2013 | Nishikawa et al. | 180/65.51 |
| 8,419,581 B2 * | 4/2013 | Lo | 475/153 |
| 2002/0148656 A1 | 10/2002 | Li | |
| 2004/0188153 A1 | 9/2004 | Liu et al. | |
| 2005/0133282 A1 | 6/2005 | Huang et al. | |

OTHER PUBLICATIONS

The Inside Story of the MotoCzysz E1pc, the World's Most Advanced Electric Motorcycle—Popular Science, http://www.popsci.com/cars/article/2010-06/inside-story-motoczysz-elpc-worlds-most-advanced-electric-motorcycle, 16 pages, accessed on Jun. 22, 2010.

Watch a Guy Make His Own Bike Lane With a Pico Projector—Gizmodo Australia, http://www.gizmodo.com.au/2011/05/watch-a-guy-make-his-own-bike-lane-with-a-pico-pr . . . , 4 pages, accessed on May 24, 2011.

ZAP's New All-Wheel Electric Mini Dirt Bike—ZAP! Electric Vehicles, http://www.zapworld.com/node/767, 1 page, accessed on May 12, 2010.

Rokon Two Wheel Drive Motorcycle, Best Off Road Vehicle, About Rokon, http://www.rokon.com/about/index.htm, 3 pages, accessed on Jul. 29, 2011.

LightLane Design, http://www.lightlanebike.com/design_01.html, 1 page, accessed on Jul. 29, 2011.

Report smart to reveal electric scooter at Paris Motor Show—Autoblog Green, http://green.autoblog.com/2010/07/14/report-smart-to-reveal-electric-scooter-at-paris-motor-show/,8 pages, accessed on Jul. 29, 2011.

Office action mailed Jan. 29, 2013 in U.S. Appl. No. 13/117,602, filed May 27, 2011.

International Search Report dated Sep. 21, 2011, International Application No. PCT/US2011/038405, International Filing Date May 27, 2011.

Written Opinion dated Sep. 21, 2011, International Application No. PCT/US2011/038405, International Filing Date May 27, 2011.

* cited by examiner

MOTOR ASSEMBLY FOR TWO WHEELED VEHICLE

CROSS-REFERENCE TO RELATED APPLICATIONS

This application claims the benefit of U.S. Provisional Application No. 61/349,015, filed on May 27, 2010. The entire disclosure of the above application is incorporated herein by reference.

FIELD

The present disclosure relates to a two wheeled vehicle and, more particularly, relates to a motor assembly for a two wheeled vehicle

BACKGROUND

This section provides background information related to the present disclosure which is not necessarily prior art.

Motorcycles, mopeds, scooters and other two wheeled motorized vehicles are the vehicle of choice for millions of riders. These vehicles can be relatively compact as compared to full size cars and trucks, and therefore, these vehicles can maneuver with relative ease through heavy traffic and other crowded areas.

Also, these vehicles can be relatively lightweight, allowing for quicker accelerations and better handling. Moreover, because these vehicles are relatively low weight, these vehicles can be fairly fuel efficient.

Although conventional two wheeled vehicles have functioned adequately for their intended purposes, several needs remain. For instance, conventional two wheeled vehicles may still be too large to ride in extremely congested areas, too bulky to store in small areas, etc. Also, while these vehicles do provide fuel efficiencies, many of these vehicles still consume substantial amounts of fuel, produce harmful emissions, and the like.

Accordingly, there remains a need for an extremely compact two wheeled motorized vehicle that is even more fuel efficient than conventional vehicles. Moreover, there remains a need for one or more safety features for a two wheeled motorized vehicle of this type. In addition, there remains a need for a configurable vehicle of this type. Still further, there remains a need for a vehicle of this type, which can be manufactured efficiently.

SUMMARY

This section provides a general summary of the disclosure, and is not a comprehensive disclosure of its full scope or all of its features.

A wheel assembly is disclosed that includes a tire and an electrical motor having a stator and a rotor. The wheel assembly also includes a rim that is encircled by the tire. At least one of the stator and rotor is directly exposed to the rim. Both the stator and the rotor are housed by the rim. The electrical motor is operable to drivingly rotate the rim and the tire.

A wheel assembly for a two wheeled vehicle is also disclosed that includes a tire and an electrical motor having a stator and a rotor. The wheel assembly also includes a rim that is encircled by the tire. At least one of the stator and the rotor is directly exposed to the rim, and both the stator and the rotor are housed by the rim. The electrical motor is operable to drivingly rotate the rim and the tire. Furthermore, the rim is monolithic and weld-free.

Moreover, a two wheeled vehicle is disclosed that has a first wheel assembly and a second wheel assembly. Each of the first and second wheel assemblies include a tire an axle defining an axis of rotation, and a brushless DC electrical motor having a stator and a rotor. The stator is fixed relative to the axle. The wheel assemblies also include a rim having an inner ring portion that defines an interior space and an opening. The rim also has an outer ring portion that encircles the inner ring portion, and a plurality of spoke portions that extend radially between the inner and outer ring portions. The inner ring portion, the outer ring portion, and the plurality of spoke portions are integrally connected so as to be monolithic and weld-free. The tire is fixed to and encircles the outer ring portion of the rim. The electrical motor is received within the interior space of the inner ring portion such that the rotor is fixed directly to an interior surface of the inner ring portion. Furthermore, the electrical motor drivingly rotates the rim and the tire about the axis of rotation. Additionally, the wheel assemblies include an end cap that is fixed to the inner ring portion of the rim to cover the opening wherein the stator is directly exposed to the end cap. The stator and the rotor are encased only by the inner ring portion of the rim and the second end cap.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Referring initially to FIGS. 1-9, a two wheeled vehicle 10 is illustrated according to various exemplary embodiments.

As will be discussed, the two wheeled vehicle 10 can provide convenient transportation for at least one rider 12 (FIG. 1) on surfaced streets, off-road, or on any other suitable riding surface. The vehicle 10 is illustrated with one rider 12; however, it will be appreciated that the vehicle 10 can be adapted for accommodating more than one rider 12 in some embodiments.

Figure 10:
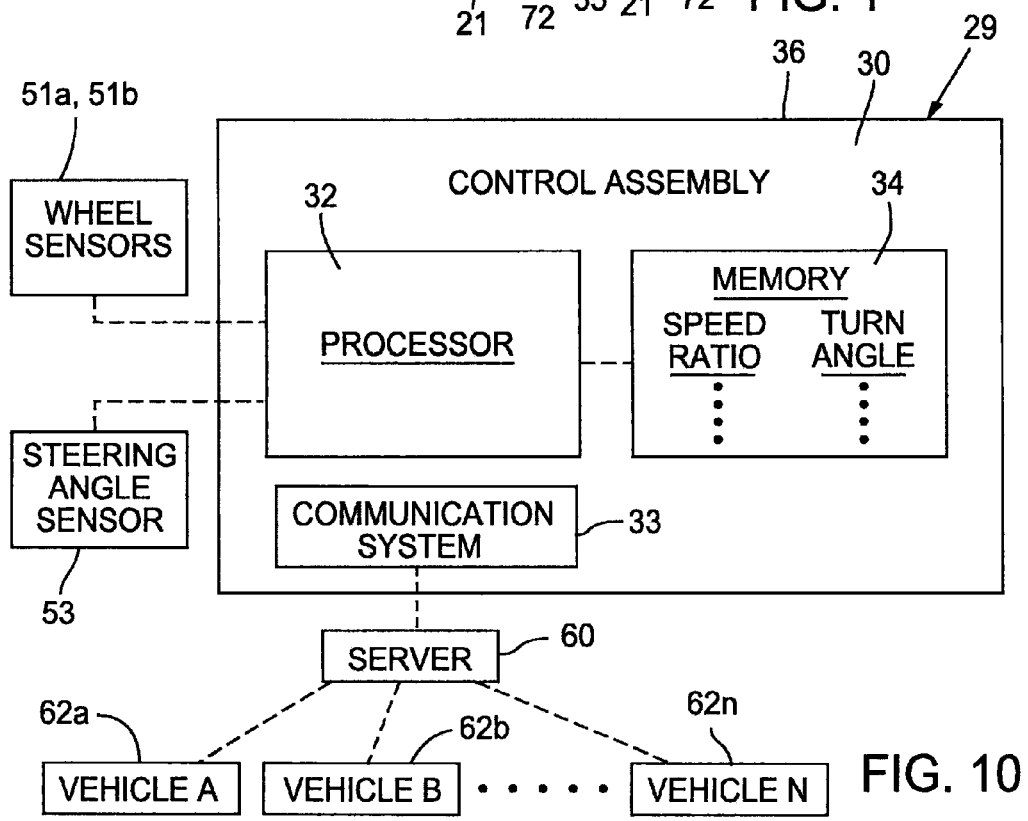
FIG. 10 is a schematic view of a control assembly of the vehicle of FIG. 1.
Figure 2:
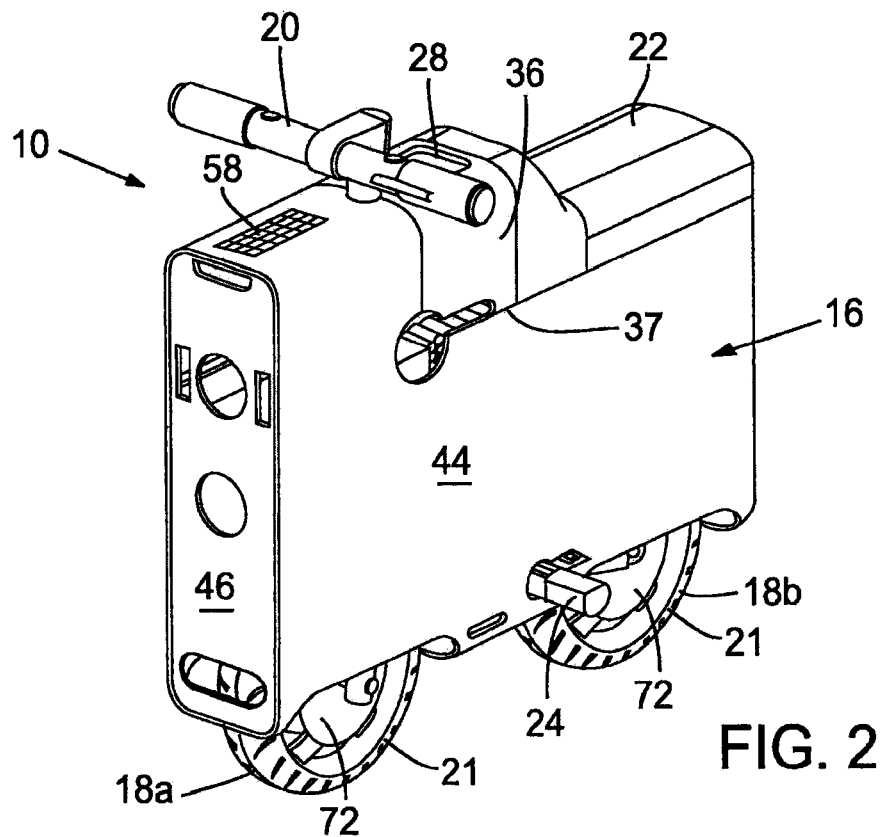
FIG. 2 is a perspective view of the vehicle of FIG. 1.
Figure 3:
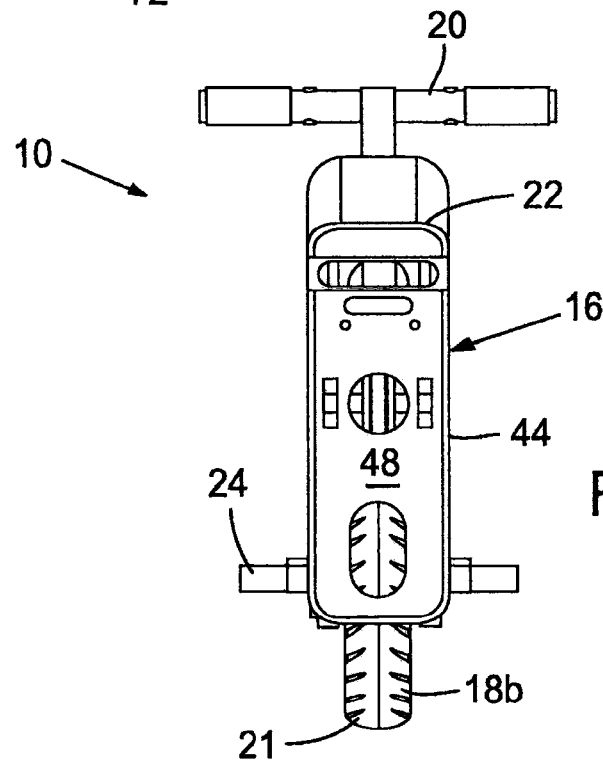
FIG. 3 is a rear view of the vehicle of FIG. 1.
Figure 4:
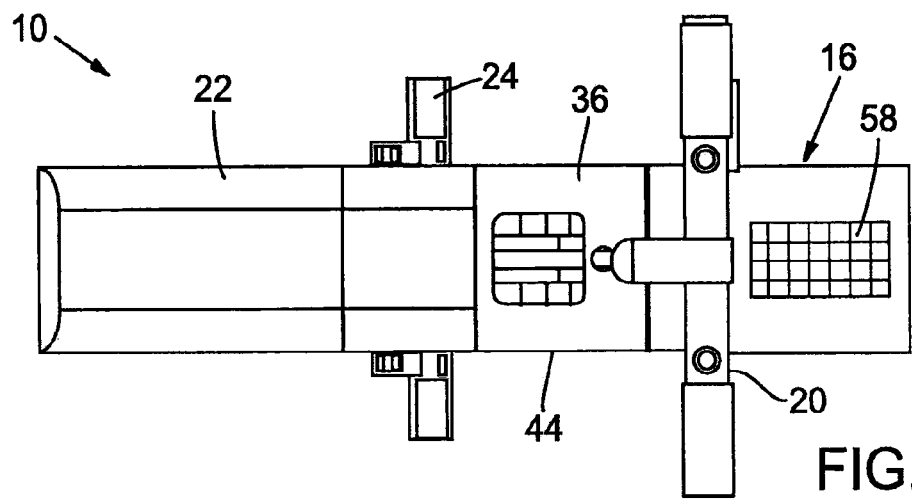
FIG. 4 is a top view of the vehicle of FIG. 1.
Figure 5:
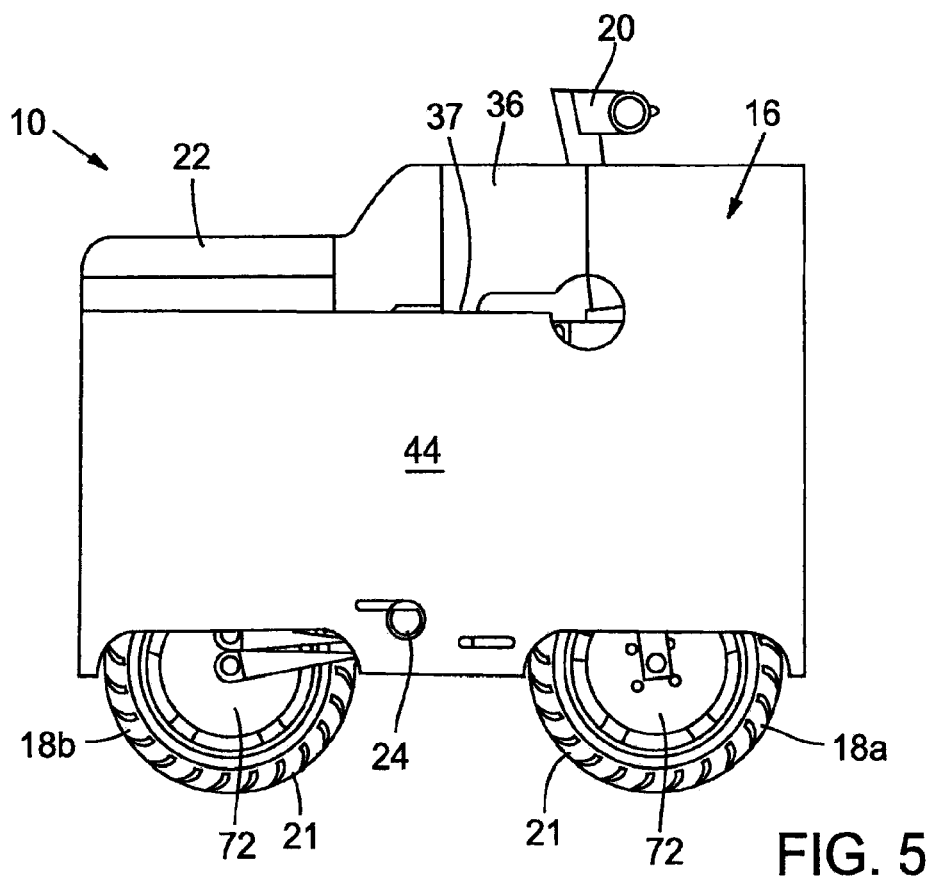
FIG. 5 is a side view of the vehicle of FIG. 1.

The vehicle 10 can include a main body 14 (FIGS. 6-9) with a frame assembly 15 (FIGS. 6-9) and an outer body panel assembly 16 that covers the frame assembly 15 (FIGS. 1-5). The vehicle 10 can also include a control assembly 29 with a controller 30 that is housed by a controller housing 36 (FIG. 10). The controller 30 can communicate with and provide control signals to the various systems of the vehicle 10 as will be discussed. Moreover, the control assembly 29 can be removably coupled to the main body 14 so as to be modular as will be discussed. Also, the vehicle 10 can include front and rear wheel assemblies 18a, 18b that are each rotatably coupled to the main body 14. The wheel assemblies 18a, 18b are arranged in a single track fashion similar to a motorcycle, scooter, moped, or motorized bicycle such that the axes of rotation of the wheel assemblies 18a, 18b are non-aligned with each other. In some embodiments, the track of the wheel assemblies 18a, 18b can be substantially aligned with each other when the vehicle 10 travels in a straight line. In other words, the imaginary line tangent to the wheel assembly 18a, 18b and parallel to the direction of travel for each wheel assemblies 18a, 18b can be substantially colinear when the vehicle 10 travels straight. However, in other embodiments, the track of the wheel assemblies 18a, 18b can be offset from each other in a direction parallel to the axis of rotation of the wheel assemblies 18a, 18b. In the latter case, the offset can be as much as 0.25 inches. This offset can provide added stability for the vehicle 10, especially at low speeds, because less work is necessary for balancing the vehicle 10. The offset can also reduce tread/tire wear.

The wheel assemblies 18a, 18b can extend partially out of the outer body panel assembly 16 and can support the main body 14. Still further, the vehicle 10 can include handlebars 20, a seat 22 on which the rider 12 can be supported, and foot pegs 24 that extend out from the outer body panel assembly 16.

The wheel assemblies 18a, 18b can be of any suitable size and type. For instance, the wheel assemblies 18a, 18b can each include a respective tire 21 (e.g., an approximately ten inch diameter tire 21 with a width of approximately four inches). Also, the tires 21 can be airless tires or can be an inflatable tire 21.

Moreover, the wheel assemblies 18a, 18b can be operably coupled to the main body 14 by a respective suspension system (e.g., shocks, struts, etc.). As will be discussed, the suspension system can allow the center of gravity and pivot point of the vehicle 10 to be relatively low to the ground (e.g., between approximately seven (7) and twelve (12) inches from the ground). This can increase stability of the vehicle 10, can allow the vehicle 10 to be relatively compact (e.g., with a relatively short wheel base), and/or can increase cargo space within the vehicle 10.

The vehicle 10 can also include a throttle or other input device that the rider 12 can use to accelerate the vehicle 10. The throttle can be operably coupled to the handlebar 20. The vehicle 10 can also include one or more motors 50 (FIGS. 11 and 12), which will be described below, and rotation of the throttle can increase output of the motor 50 to drivingly rotate the wheel assemblies 18a, 18b and accelerate the vehicle 10. The throttle can be mechanically coupled (via a mechanical linkage) to the motor 50, or signals can be transferred from the throttle to the motor 50 via a drive-by-wire system. It will be appreciated that the drive-by-wire system can allow the handlebars 20 to be more self-contained and can allow the throttle to be moved between the left and right handlebars 20 (e.g., to accommodate both right-handed and left-handed riders 12). Moreover, this system can allow the handlebars 20 to be more modular and more easily retracted or folded into or toward the outer body panel assembly 16 or entirely removed from the vehicle 10.

Moreover, one or both wheel assemblies 18a, 18b can be equipped with a respective braking system (disc brakes, drum brakes, regenerative brakes, etc.). Also, handlebars 20 can include braking controls (e.g., hand brake levers) used to selectively activate the braking system and decelerate the vehicle 10 as will be discussed. Moreover, the vehicle 10 can include an emergency brake for braking the vehicle 10. The brakes can be of any suitable type, such as mechanical brakes, hydraulic brakes, pneumatic brakes, etc. Also, in some embodiments, one or both wheel assemblies 18a, 18b can include an electric motor used for both drivingly rotating the respective wheel assembly 18a, 18b and for decelerating the vehicle 10 as will be discussed. The braking system can be physically connected to the controls (brake levers, etc.) or the braking system can be a brake-by-wire system.

The front wheel assembly 18a can be steerable and can have a maximum steering angle ranging between approximately ten (10) to thirty-five (35) degrees from center in both directions. For instance, in some embodiments, the maximum steering angle is approximately 18.5 degrees from center in both directions.

Figure 1:
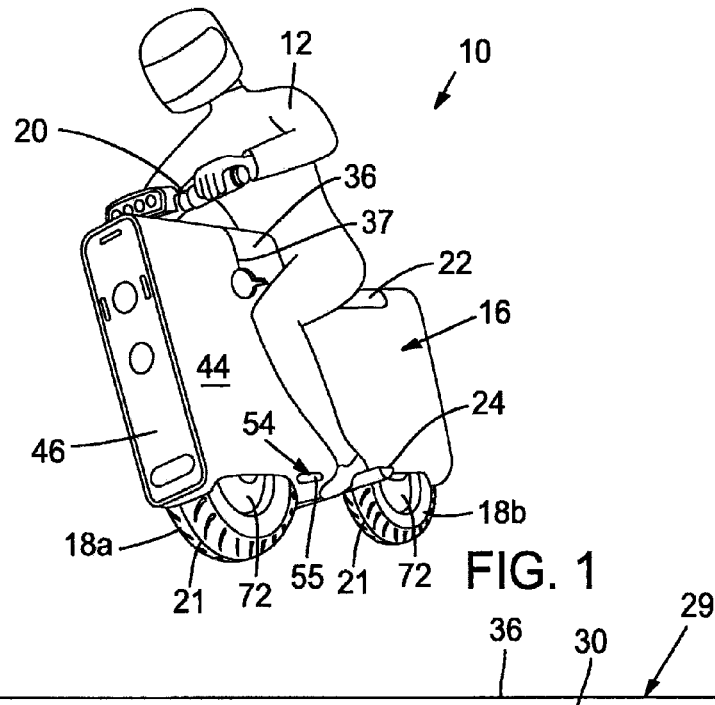
FIG. 1 is a perspective view of an exemplary embodiment of a two wheeled vehicle and rider according to various teachings of the present disclosure.

In addition, in some embodiments, one or both of the wheel assemblies 18a, 18b can be selectively retractable within the outer body panel assembly 16 toward and away from the ground. Also, in some embodiments, the vehicle 10 can include a retainer device (not specifically shown) that selectively retains the wheel(s) 18a, 18b in the retracted position and alternatively in the extended position. Accordingly, the wheel(s) 18a, 18b can selectively retract within the outer body panel assembly 16 to make the vehicle 10 more compact. Alternatively, one or both wheel assemblies 18a, 18b can be selectively extended at least partially out of the outer body panel assembly 16, as shown in FIG. 1, in order to rollingly support the vehicle 10. It will be appreciated that the wheel assemblies 18a, 18b can retract and move in any suitable direction relative to the main body 14 in order to move between the retracted and extended positions. Moreover, the movement of the wheel assemblies 18a, 18b between the retracted and extended positions can be controlled manually (e.g., by hand) or automatically (e.g., by electrical motors).

In addition, in some embodiments, the handlebars 20 and/or the footpegs 24 can be selectively extendable and retractable. For instance, when the vehicle 10 is going to be stored, the handlebars 20 and/or the footpegs 24 can be retracted (e.g., actuated, folded, or otherwise retracted toward and/or inside the outer body panel assembly 16). Then, before use of the vehicle 10, the handlebars 20 and/or the footpegs 24 can be actuated, unfolded, or otherwise extended away from and/or outside the outer body panel assembly 16. This movement can be controlled manually or automatically.

Also, as will be discussed, the vehicle 10 can include an all-wheel-drive system. In other words, the wheel assemblies 18a, 18b can be independently driven by respective motors and controlled to provide all wheel drive to the vehicle 10. As will be discussed, the all-wheel-drive system can improve handling, for instance, because the vehicle 10 can have a relatively short wheel base. However, in other embodiments, only one of the wheel assemblies 18a, 18b is drivingly rotated by a motor. In still other embodiments, both wheel assemblies 18a, 18b are drivingly rotated by the same motor.

In addition, the vehicle 10 can include a lighting system 17. The lighting system 17 can include any number of devices for emitting light, such as one or more headlights, brake lights, turning signals, and other lights. These lights can include light-emitting diodes (LEDs) such that power consumption by the lighting system 17 is relatively low.

Furthermore, the vehicle 10 can include rearview mirrors, for instance, mounted to the handlebars 20. It will be appreciated that these features can be included such that the vehicle 10 can comply with corresponding traffic laws or other rules and regulations.

The vehicle 10 can also include an energy storage device 19 or power source for providing power to the various electrical components of the vehicle 10 (e.g., the lighting system 17, computerized control systems, motor(s), etc.) The energy storage device 19 can be of any suitable type, such as a battery assembly 26, which is schematically illustrated in FIGS. 6-9. The battery assembly 26 can include two battery packs, which can include any suitable number of cells (e.g., lithium-ion cells). For instance, in some embodiments, only one battery pack is used for powering the vehicle 10, and the other battery is a backup battery pack that selectively powers the vehicle 10 when the first battery pack runs low on stored energy. In some embodiments, the vehicle 10 can have a range of approximately eighty miles per charge when driving at approximately twenty miles per hour. Also, in some embodiments, the vehicle 10 can have a range of approximately sixty miles per charge when driving at approximately twenty-five miles per hour. It will be appreciated that the range provided by the battery assembly 26 or other energy storage device 19 can vary (e.g., between 20 miles to 100 miles per charge). Also, in some embodiments, the vehicle 10 can accept one or more upgraded battery assemblies 26 for extending the range of the vehicle 10.

The battery assembly 26 can be rechargeable. For instance, the vehicle 10 can include a power cord for plugging into a conventional power outlet to thereby recharge the battery assembly 26. Furthermore, if the battery assembly 26 is running low on stored power, the battery assembly 26 can be removed and replaced with a charged battery assembly 26. In addition, the battery assembly 26 can be removed and charged separate from the vehicle 10 in some embodiments. Moreover, in some embodiments, the braking system for the decelerating the wheel assemblies 18a, 18b can generate power during use, such that application of the brakes generates electricity, which is transmitted to the battery assembly 26 for storage.

Also, in some embodiments, the vehicle 10 can include one or more solar cells 58 (FIGS. 2 and 4) for converting light into energy, which is then used to recharge the vehicle battery assembly 26. The solar cells 58 can also provide power to systems when the vehicle 10 is powered down to thereby maintain standby electronic management of the vehicle 10. The solar cells 58 can be disposed in any suitable location on the vehicle 10, such as the outer body panel assembly 16, the main body 14, and/or the handlebars 20. The solar cell 58 can be operated continuously while the vehicle 10 is powered up so that the solar cell 58 continuously supplies energy to the battery assembly 26. Additionally, in some embodiments, the solar cell 58 can be removably connected to the vehicle 10. For instance, the solar cell 58 can be a separate unit that removably and electrically connects to the battery assembly 26 for selective use. As such, the solar cell 58 can be foldable to be more compact when not in use. Also, in some embodiments, the vehicle 10 can include a solar cell 58 that is fixedly connected to the vehicle 10 and an additional solar cell 58 that is removably connected to the vehicle 10, wherein the fixed solar cell 58 continuously charges the battery assembly 26, and the removable solar cell 58 is selectively available for additional charging capability (e.g., when the vehicle 10 is parked and/or powered down).

The vehicle 10 can also include a variety of user control devices, such as a throttle, which is operably coupled to the handlebars 20. Also, the vehicle 10 can include turning signal controls and a handbrake lever (not specifically shown), which are both operably coupled to the handlebars 20. In some embodiments, the vehicle 10 can include a clutch control (e.g., clutch control lever) for controlling a clutch of a transmission system; however, in other embodiments, the vehicle 10 can be a direct drive system without a transmission system, such that a clutch control is not included.

Still further, the vehicle 10 can include one or more displays 28, which is/are disposed adjacent the handlebars 20 or elsewhere on the vehicle 10. In some embodiments, the display 28 can be touch-sensitive (i.e., the display 28 can be a touch-sensitive input device). As such, the rider 12 can input control commands by physically touching the display 28 to control the various components of the vehicle 10 in a convenient manner. It will be appreciated, however, that the vehicle 10 can include any other input device for inputting control commands. Additionally, the display 28 can provide information about the vehicle visually. For instance, the display 28 can indicate the amount of available charge within the battery in the vehicle 10, the charging state of the battery, the current vehicle mode, wireless interface status, and/or other information. Moreover, the display 28 can indicate to the user that the vehicle 10 is communicating wirelessly with another vehicle 10 or with an external device. Also, in some embodiments, the vehicle 10 can include audio transducers (e.g., speakers) for providing alarms about the state of the vehicle 10 or other audible signals. Moreover, in some embodiments, the vehicle 10 can include tactile transducers (e.g., vibrating surfaces) for providing information about the vehicle 10 in a tactile fashion.

It will be appreciated that the vehicle 10 can be relatively compact and lightweight. For instance, in some embodiments, the total length of the vehicle 10 can be between approximately 20 inches to 100 inches (e.g., 40 inches or approximately one (1) meter). Also, the wheel base length can be between approximately 10 to 75 inches. Additionally, the wheel base length can be between 26 inches and 36 inches. Furthermore, the height (i.e., wheel base to handlebars 20) can be between approximately 10 to 100 inches (e.g., 37 inches). Moreover, the width of the outer body panel assembly 16 can be between approximately 4 inches to 60 inches (e.g., 8.5 inches), and the width of the handlebars 20 (end-to-end) can be approximately 22 inches.

Furthermore, the vehicle 10 can be compact enough and light enough for shipping using standard means. For example, the vehicle 10 can be shipped in one complete unit or in separate parts, with each part weighing less than the limit for standard freight shipping (e.g., 100 pounds). In addition, the vehicle 10 can be configured for sale and distribution on the internet or other computerized electronic network. Also, the vehicle 10 can include designated hand grips (separate from the handlebars 20) for lifting and moving the vehicle 10 when the vehicle 10 is not powered. Thus, the vehicle 10 can be very portable.

Referring to FIG. 10, exemplary embodiments of the control assembly 29 will now be discussed. As stated above, the control assembly 29 can include a controller 30, a processor 32, a memory module 34, as well as other computerized components suitable for controlling the various systems of the vehicle 10. In addition, the control assembly 29 can include a gyroscope or other similar component for detecting the orientation of the vehicle 10 in space, and this data can be processed by the processor 32 for controlling the vehicle 10.

Additionally, as shown in FIG. 10, the control assembly 29 can include a communication system 33 for communicating information with a server 60 and/or other vehicles 62a, 62b, 62n within a computerized network. In some embodiments, the control assembly 29 can download programs, maps, or other information from the server 60, can upload past or present operating conditions of the vehicle 10 to the server 60, and/or can transmit any other suitable information to the server 60 and/or the vehicles 62a, 62b, 62n within the network. The communication system 33 can include a wireless transceiver (e.g., Bluetooth and/or digital signal transmitting and decoding devices) and/or can include one or more connectors for attaching wires for establishing communications.

As mentioned above, the controller 30, the processor 32, the memory module 34, the communications system 33 and other components of the control assembly 29 can be self-contained within the controller housing 36. The controller housing 36 can be made out of a strong, rigid material that is similar to the material of the outer body panel assembly 16. Also, in some embodiments, the display 28 can be provided and exposed through the controller housing 36.

As mentioned above, the controller housing 36 can house the controller 30, the processor 32, the memory module 34, the communication system 33, the display 28, and other components of the control assembly 29, independent of the main body 14, the wheel assemblies 18a, 18b, the lighting system 17, motors, etc. Also, the control assembly 29 can be removably attached to the main body 14 of the vehicle 10. For instance, the outer body panel assembly 16 can define an opening 37 into which the control assembly 29 can be removably received. The controller housing 36 can remain exposed when attached to the main body 14 such that the controller housing 36 partially defines an outermost surface of the vehicle 10. In other embodiments, the outer body panel assembly 16 can include a covered compartment in which the control assembly 29 is received and housed.

The vehicle 10 can also include a latch assembly that removably secures the control assembly 29 to the main body 14. The latch assembly allows the control assembly 29 to be removed from the main body 14 by hand without the need for special tools.

When the control assembly 29 is attached to the main body 14, the control assembly 29 can be in communication with the battery assembly 26, the lighting system 17, motor(s) 50 that drive the wheel assemblies 18a, 18b, and other components of the vehicle 10. For instance, the vehicle 10 can include one or more electrical couplings that establishes electrical communication between the control assembly 29 and these components. Specifically, the electrical coupling can include a male connector mounted the control assembly 29 and a female connector mounted on the main body 14, or vice versa. The male and female connectors can removably and electrically connect together when the control assembly 29 is attached to the main body 14. As such, control signals, feedback signals, etc. can be transmitted between the control assembly 29 and the electrical components of the main body 14 when the control assembly 29 is attached to the main body 14.

The control assembly 29 can also include connectors (e.g., USB ports, firewire, HDMI, RGB, etc.) for establishing electrical communication with external devices, and these connectors can be used for uploading information, downloading information, connecting with a cellular telephone, etc. The controller 30 can also be equipped with its own software (e.g., integrated communication engine) for upgrading or adding user features, diagnostics, and/or interfacing with other electrical devices such as portable electronic devices, cell phones, etc. via standard computer interfaces such as a USB port. Additionally, the control assembly 29 can have an energy storage device, such as a battery, that is used to power the control assembly 29 (e.g., to power the display 28) when the control assembly 29 is separated from the main body 14 of the vehicle 10. Also, in some embodiments, the control assembly 29 can include a respective power cord for connecting to a standard power outlet for powering the control assembly 29 when separated from the main body 14.

The stand-alone weight of the control assembly 29 can be relatively low so that the control assembly 29 can be carried easily by hand. Also, the control assembly 29 can include a handle, strap, or other similar feature to make the control assembly 29 even more portable.

Thus, the rider 12 can transport the control assembly 29 away from the rest of the vehicle 10 when desired. Accordingly, the rider 12 can be park the vehicle 10 in a public space and take the control assembly 29 away from the parked vehicle 10, thereby rendering the vehicle 10 undrivable and also taking some of the most expensive components away from the vehicle 10.

Also, in some embodiments, the control assembly 29 can be a modular component that can be interchangeable with other control assemblies 29. Thus, a newer control assembly 29 with updated software or other additional features can be used to replace an older control assembly 29. Accordingly, the vehicle 10 can be upgraded very easily.

Figure 8:
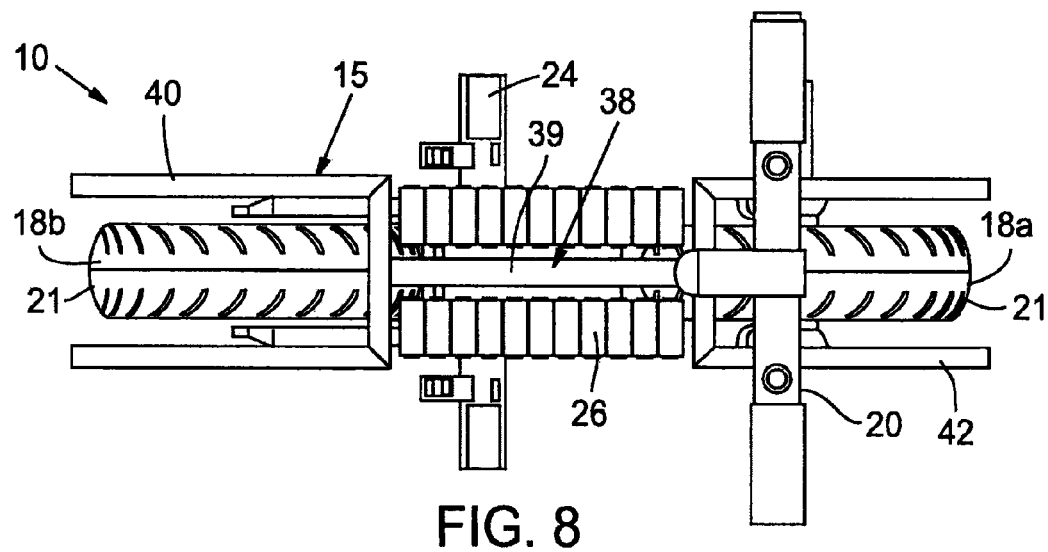
FIG. 8 is a top view of the vehicle of FIG. 1 with the outer body panel assembly removed.
Figure 9:
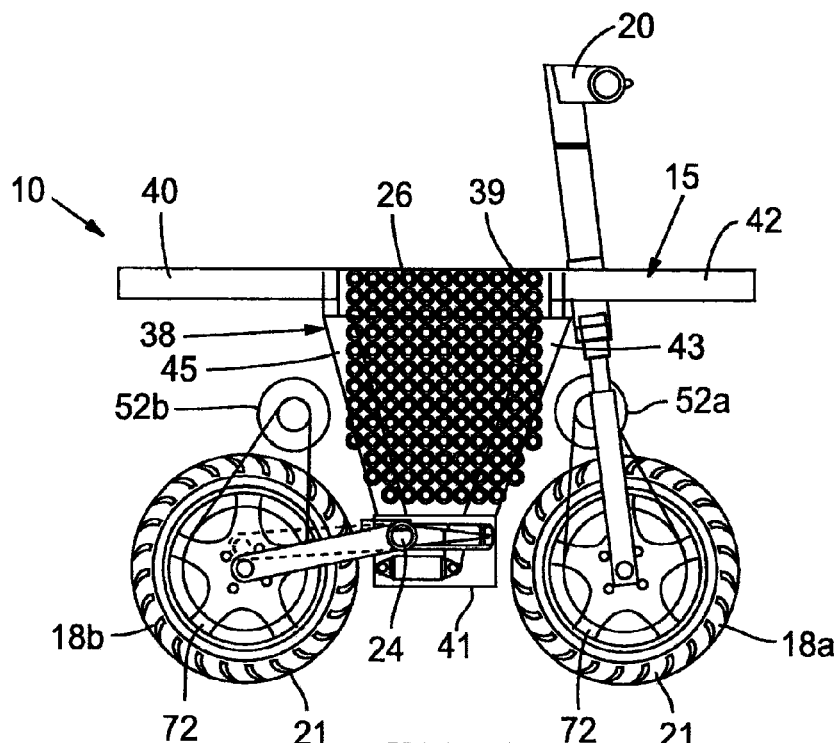
FIG. 9 is a side view of the vehicle of FIG. 1 with the outer body panel assembly removed.

Referring now to FIGS. 6-9, the frame assembly 15 will be described in greater detail. The frame assembly 15 can include a plurality of interconnected, elongate, and hollow rigid members. The frame assembly 15 can be substantially be made out of aluminum, steel, or any other suitable material. Also, the elements of the frame assembly 15 can be attached in any suitable fashion, such as by welding, fasteners, and the like. As shown in FIG. 9, the frame assembly 15 can include a center frame 38 with a central beam 39, a lower beam 41, a forward beam 43, and a rear beam 45. The forward and rear beams 43, 45 can be fixed together and can extend between the upper and lower beams 39, 41. Also, as shown in FIG. 8, the frame assembly 15 can include a rear upper frame member 40 and a forward upper frame member 42. The upper frame members 40, 42 can each be generally U-shaped and can extend from opposite ends of the center beam 39. Accordingly, the frame assembly 15 can be relatively lightweight and yet sufficiently robust. Also, the frame assembly 15 can be relatively easy to manufacture.

Referring now to FIGS. 1-5, the outer body panel assembly 16 will be described in greater detail. As shown, the outer body panel assembly 16 can include a front panel 46, a rear panel 48, and a side panel assembly 44. The front rear panels 46, 48 can be substantially flat and plate-like, and the side panel assembly 44 can extend substantially continuously about the vehicle 10 and between the front and rear panels 46, 48. Also, the side, front, and rear panels 44, 46, 48 can include a plurality of openings for mounting lights, for providing clearance for the handlebars 20 and foot pegs 24, and for defining openings or wheel wells for the wheel assemblies 18a, 18b. In some embodiments, the side, front, and rear panels 44, 46, 48 of the outer body panel assembly 16 can be made out of a lightweight material, such as aluminum and/or rigid plastic material and can be highly recyclable and/or made from recycled materials. It will be appreciated that the outer body panel assembly 16 can be relatively lightweight and can also include openings for promoting airflow within and through the vehicle 10 for cooling the battery assembly 26, the control assembly 29, and other components of the vehicle 10. Also, the seat 22 can be positioned in a respective opening in the side panel assembly 44. The seat 22 can include a padded foam bun. Still further, a cargo space can be defined beneath the seat 22 and/or at the front end of the vehicle 10.

Thus, the outer body panel assembly 16 can be of a substantially rectangular, box-shaped, monolithic construction, wherein the outer body panel assembly 16 can provide structure and support as well as aesthetic appeal. In addition, because of the substantially monolithic (i.e., uni-body) construction of the outer body panel assembly 16, the outer body panel assembly 16 can provide added security for storage of items therein, including the controller 30, items within the cargo space, etc. The monolithic construction of the outer body panel assembly 16 can also greatly simplify assembly and manufacture of the vehicle 10. The outer body panel assembly 16 can also be relatively light weight, and yet the outer body panel assembly 16 can have high strength. The outer body panel assembly 16 can embody a full exoskeleton-type support or can cooperate with the frame assembly 15 to provide structural support of the vehicle 10. Furthermore, the outer body panel assembly 16 can be highly aerodynamic (i.e., low drag coefficient) to increase energy efficiency. Also, in some embodiments, the outer body panel assembly 16 can resemble a suitcase, which can reduce frontal area and produce minimal drag during travel.

Referring now to FIGS. 2, 5, 6, 11, and 12, the wheel assemblies 18a, 18b will now be discussed in greater detail. As shown, the wheel assemblies 18a, 18b can each include a tire 21, a rim 72, a hub motor 50 (FIGS. 11 and 12), and an axle 84. The rim 72 can be encircled by the tire 21, and the hub motor 50 can be housed within the rim 72. As will be discussed, the hub motor 50 can drivingly rotate the respective wheel assembly 18a, 18b about its axis of rotation.

Each axle 84 can be coupled to the frame assembly 15 (e.g., by a respective fork), and each axle 84 can rotatably support the respective motor 50, rim 72, and tire 21. In some embodiments, the axle 84 can be less than eight inches long.

Figure 11:
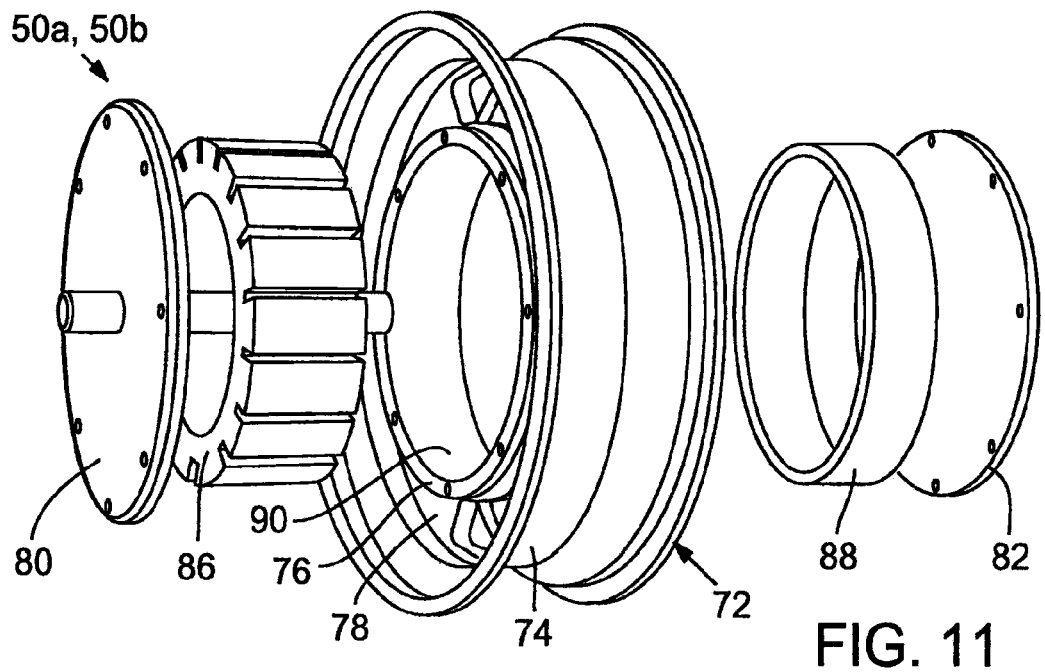
FIG. 11 is an exploded view of a wheel assembly of the vehicle of FIG. 1.
Figure 12:
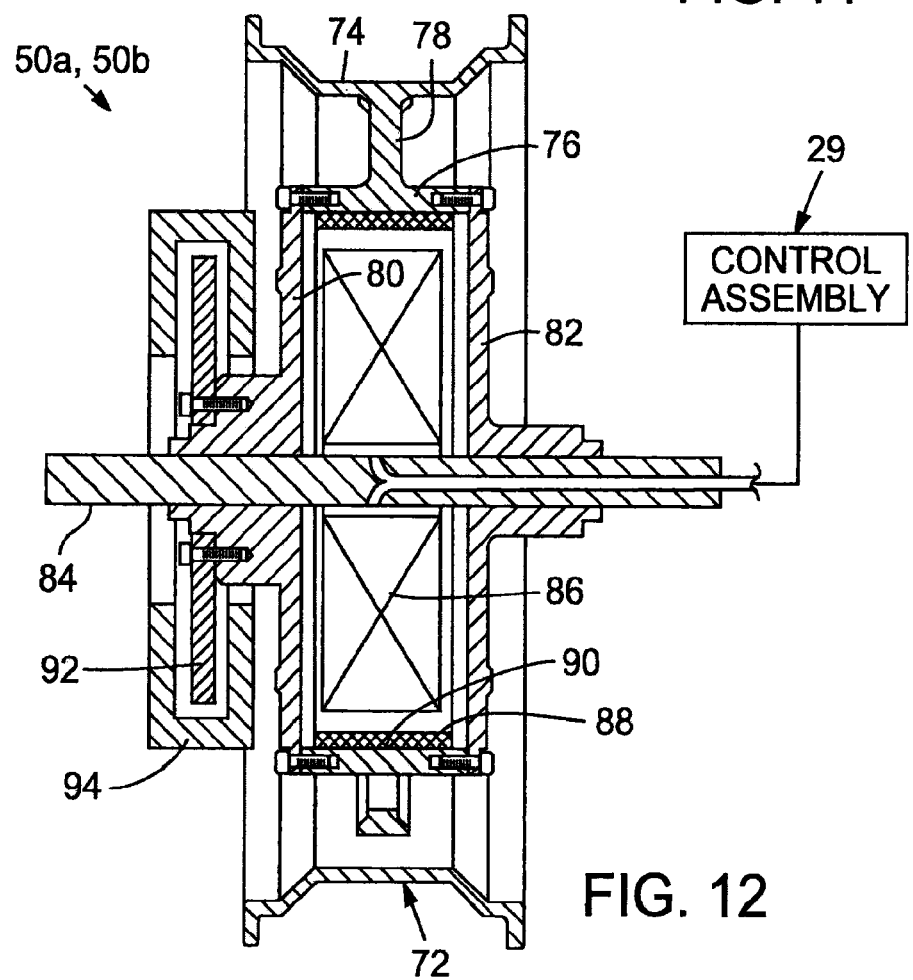
FIG. 12 is a cross sectional view of the wheel assembly of FIG. 11.

One or both of the wheel assemblies 18a, 18b can include the features shown in detail in FIGS. 11 and 12. As shown, the rim 72 can include an outer ring portion 74, an inner ring portion 76, and a plurality of spoke portions 78 that extend radially between the inner and outer ring portions 74, 76. The ring portions 76, 78 and spoke portions 78 can be integrally connected so as to be monolithic. Also, the ring portions 76, 78 and spoke portions 78 can be molded or formed on a mill and/or lathe out of Aluminum, Aluminum alloy, or any other suitable material. As such, these portions of the rim 72 can be monolithic and weld-free such that the rim 72 is relatively lightweight. However, in other embodiments, these portions of the rim 72 can be welded or otherwise fastened together.

The rim 72 can also include a first end cap 80 and a second end cap 82. The end caps 80, 82 can be substantially flat and disc-shaped and can be made out of Aluminum, Aluminum alloy, or any other suitable material. As shown in FIG. 12, the end caps 80, 82 can be fixed to opposite sides of the inner ring portion 76 (e.g., by fasteners, etc.) to thereby cover the respective openings in the inner ring portion 76 and further enclose the motor 50 within the rim 72. In other embodiments, only one of the end caps 80, 82 is removably coupled to the inner ring portion 76 (e.g., by fasteners) while the other end cap 80, 82 is integrally coupled to the inner ring portion 76 so as to be monolithic. The end caps 80, 82 can also be rotatably coupled to the respective axle 84, for instance, by a known bearing (not shown). Additionally, the rim 72 can be highly heat conductive to thereby transfer heat generated by the motor 50 away from the wheel assembly 18a, 18b.

The hub motor 50 can be of any suitable type, such as an electric motor (e.g., a brushless DC motor) having a stator 86 and a rotor 88 (both schematically shown in FIGS. 11 and 12). The stator 86 can include a plurality of electromagnets that are electrically connected to the control assembly 29 (FIG. 12), and the stator 86 can be fixed to the axle 84. The rotor 88 can include a plurality of permanent magnets that is fixed directly to an interior surface 90 of the inner ring portion 76. In other embodiments, the rotor 88 is integrally connected to the interior surface 90 so as to be monolithic. For instance, in the latter embodiment, the inner ring portion 76 can be made at least partially from a magnetic material such that the inner ring portion 76 itself functions as the rotor 88 of the motor 50.

The motor(s) 50 can also include any number of sensors to detect various conditions of the motor 50. For instance, the motor(s) 50 can include position sensors, such as HAL position sensor(s) in some embodiments.

When the stator 86 is energized, the stator 86 can drive the rotor 88 (and thus the rim 72 and tire 21) in rotation about the axle 84. It will be appreciated that the rim 72 can function both as a structural member of the wheel assembly 18a, 18b as well as a housing for the motor 50 because the stator and rotor 86, 88 can be encased only by the inner ring portion 76 and the end caps 80, 82. In other words, the stator 86 and rotor 88 can be directly exposed to the rim 72, and the motor 50 need not include a separate housing. As such, the wheel assembly 18a, 18b can be relatively low in weight. For example, each wheel assembly 18a, 18b can weigh between approximately eight and fifteen pounds apiece. It will be appreciated, however, that the motors 50 could include a housing that is separate and distinct from the rim 72. It will also be appreciated that the rim 72 can include a sealant that substantially seals any gaps and inhibits unwanted debris from intruding into the motor 50.

Also, in some embodiments, the motors 50 can be easily replaceable and interchangeable with alternate motors 50. For instance, the wheel assemblies 18a, 18b can be disassembled (e.g., the end cap(s) 80, 82 can be removed from the inner ring portion 76), and the motor 50 can be removed and replaced with alternate components. Accordingly, the wheel assemblies 18a, 18b can also be modular and adaptable.

The hub motors 50 can have any suitable output, such as one (1) to one hundred (100) horsepower. For instance, in some embodiments, the hub motors 50 can each be a four horsepower motor. Accordingly, the vehicle 10 can have any suitable maximum speed (e.g., approximately forty mph), and this maximum speed may or may not be electronically limited by the controller 30 to comply with traffic laws or any other appropriate rule or regulation. Also, the vehicle 10 can accelerate from zero to forty mph in four to six seconds in some embodiments. Furthermore, in some embodiments, the vehicle 10 can accelerate to average speed in less than twelve seconds. The motors 50 can perform as direct drive motors 50 (i.e., without a transmission system) and directly drive the rim 72 and tire 21 for added weight savings. Accordingly, the wheel assemblies 18a, 18b can be powerful and yet relatively light (e.g., approximately ten to twenty pounds each). The wheel assemblies 18a, 18b can also be relatively compact.

Referring now to FIG. 9, additional embodiments of motors 52a, 52b for the vehicle 10 are illustrated. As shown, the vehicle 10 can include respective front and rear belt drive motors 52a, 52b that are disposed outside the respective wheel assemblies 18a, 18b. The belt drive motors 52a, 52b can be electric motors or other suitable motors that are operably connected to respective ones of the front and rear wheels 18a, 18b by a respective belt.

Figure 13:
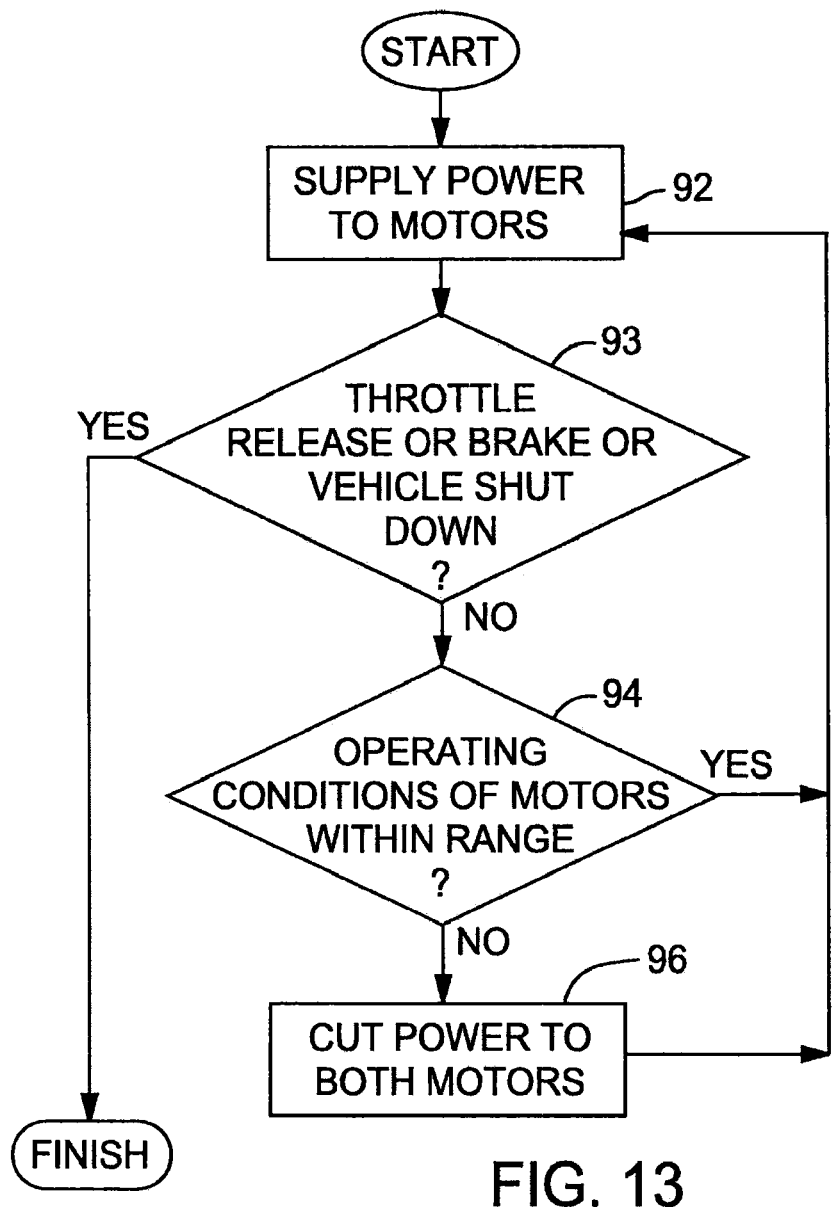
FIG. 13 is a flowchart of a method of controlling the vehicle of FIG. 1.

Referring now to FIG. 13, the control assembly 29 and a method of controlling the motors 50 will be discussed in greater detail. This method can be equally applied to the motors 52a, 52b discussed above in relation to FIG. 9 as well.

As mentioned above, the control assembly 29 can independently control the motors 50 such that the motors 50 drive rotation of the first and second wheel assemblies 18a, 18b independent of each other. Thus, the control assembly 29 can provide all wheel drive for the vehicle 10. This can provide added stability for the vehicle 10, especially considering the relatively short wheel base of the vehicle 10. It will also be appreciated that the all wheel drive system can allow for increased power output with less energy draw, thereby making the vehicle 10 more energy efficient. Furthermore, power output can be varied between the motors 50 to thereby increase efficiency.

Assuming that the vehicle 10 is powered ON and the rider 12 has turned the throttle, the controller 30 can cause a corresponding amount of current, voltage, power, etc. to be supplied from the battery assembly 26 to both motors 50 (block 92 in FIG. 13). In some embodiments, substantially equal amounts of current, voltage, power, etc. (substantially equal electrical input) can be delivered to the motors 50.

Then, in decision block 93, it is determined whether the throttle has been released, whether the brake lever has been actuated to decelerate the vehicle, or whether the vehicle 10 has been powered down. If so (block 93 answered affirmatively), then the method is completed. However, if not (block 93 answered negatively), then the method continues in block 94.

In decision block 94, the controller 30 compares an operating condition of the motors 50 of the first and second wheel assemblies 18a, 18b. Specifically, the controller 30 can monitor and detect the current level, voltage, power level, angular velocity, or any other operating condition or any output of the motors 50. Furthermore, the controller 30 can determine whether these compared operating conditions are within a predetermined range of each other. In some embodiments, the predetermined range can be between 90% and 100%, and in some additional embodiments, the predetermined range can be between 95% and 100%. The controller 30 can maintain the motors 50 within this range, for instance, by employing comparative motor synchronization control methods.

If the operating conditions are outside the predetermined range (i.e., block 94 answered negatively), then in block 96, the controller 30 can reduce power, voltage, current, etc. to one or both motors 50. Specifically, in some embodiments of block 96, the controller 30 substantially simultaneously cuts power to both motors 50. Power can be cut for a predetermined amount of time (e.g., a fraction of a second) before block 92 is repeated and power is restored to the motors 50. The method is looped as such until the throttle is released, the brakes are applied, or the vehicle is shut down (block 93 answered affirmatively).

Operating as such, the controller 30 can provide traction control (i.e., can reduce slippage of the wheel assemblies 18a, 18b). For instance, if the rear wheel 18b begins to slip due to loss of traction on a slippery riding surface, the current level, angular velocity, or other operating condition of the rear wheel assembly 18b can spike as compared to the current level of the front wheel assembly 18a. The controller 30 can detect this substantial difference in current level of the wheel assemblies 18a, 18b, and the controller 30 can cut power to both motors 50 of the wheel assemblies 18a, 18b for a fraction of a second before re-supplying power to both. The controller 30 can repeat this process until the rear wheel assembly 18b regains traction and the respective operating conditions of the rear wheel assembly 18b return to within the range of the operating conditions of the front wheel assembly 18a.

Furthermore, these methods can maintain both wheel assemblies 18a, 18b in contact with the road or other riding surface. For instance, if the front wheel assembly 18a begins to lift from the road (i.e., a "wheelie" condition), the current level, angular velocity, etc. of the front wheel assembly 18a is likely to ramp outside the predetermined range of the rear wheel assembly 18b. The controller 30 can cut power to both wheel assemblies 18a, 18b, thereby causing the front wheel assembly 18a to regain contact with the road. The same control method can substantially prevent the rear wheel 18b from lifting from the road (i.e., a "front end-o" condition). It will be appreciated that either wheel assembly 18a, 18b can lift from the riding surface without having to cut power to the motors 50 (e.g., while riding on rougher terrain or off-roading) as long as the operation of the motors 50 stays within the predetermined range discussed above.

While riding through a turn, the wheel assemblies 18a, 18b will likely rotate at different angular velocities. The difference in angular velocity will depend on the radius of the turn. As stated, the controller 30 can maintain operation of the motors 50 within the predetermined range. This range can be sufficiently wide to allow the wheel assemblies 18a, 18b to spin at different velocities to complete most turns. Also, if the vehicle 10 is travelling through a very tight turn, the controller 30 can temporarily cut power to one or both motors 50 to allow the resultant difference in angular velocities of the motors 50, thereby allowing the vehicle 10 to complete the turn.

Still further, because of these control methods, operations of the motors 50 can be automatically adapted for a wide variety of riders 12 having different weights, heights, riding positions on the vehicle 10, grade, etc. More specifically, the vehicle 10 carrying a lighter weight rider 12 that rides primarily upright will have a different center of gravity than the vehicle 10 carrying a heavier rider 12 riding primarily hunched over. Regardless, the controller 30 can provide traction control, etc. in the same manner discussed above and illustrated in FIG. 13. Accordingly, the controller 30 can automatically determine appropriate vehicle accelerations and/or decelerations for the current riding surface, grade, rider weight, rider position, and/or vehicle loading. Thus the vehicle 10 can self-adapt for safe and stable riding, further enhancing stability.

Moreover, the controller 30 can maintain acceleration and/or deceleration of the wheel assemblies 18a, 18b to within predetermined limits to improve ride quality. This can occur across all modes of steady state motor rotation and vehicle motion at coast and steady-state applied power.

Moreover, the motors 50 can be used for braking (decelerating) the vehicle. Specifically, one or more hand-brake control levers can be mounted to the handlebars 20, and upon actuating these levers, corresponding reverse voltage can be supplied to one or both motors 50 (i.e., polarity can be reversed, current injection, etc.) to thereby decelerate the vehicle 10. The system can decelerate both wheels 18a, 18b independently or equally. Electricity can also be generated in this fashion for recharging the battery assembly 26. In some embodiments, the braking can be selectively controlled by the user (e.g., by inducing the electronic braking system to a percentage for coasting). In some embodiments, the vehicle 10 can include a switch that changes the mode of the motor(s) 50 between an electricity generating mode and a driving mode (i.e., the switch can change the polarity supplied to the motor(s) when changing between these modes).

The controller 30 can also operate to detect various riding conditions of the vehicle 10 that are suitable for switching the motor 50 to the electricity generating mode and back to the driving mode. For instance, the controller 30 can detect that the rider 12 has actuated the brake lever, that the vehicle 10 is coasting, and/or that the vehicle is traveling downhill, each of which might cause the controller 30 to automatically switch the motor 50 to generate electricity.

Also, in some embodiments, the controller 30 can cause one motor 50 to generate electricity while the other motor 50 drivingly rotates its respective wheel assembly 18a, 18b. In other words, the motors 50 can be operating in the electricity generating mode and driving mode simultaneously. Thus, at any given time, one motor 50 may switch to electricity generating mode while the vehicle 10 is being propelled by the other motor 50. This switching can occur on either the front motor 50 or the rear motor 50 at any suitable time. In this situation, the polarities supplied to the motors 50 would be opposite each other. As stated, the controller 30 can operate to detect various riding conditions that are suitable for placing the motors 50 simultaneously in these opposite modes. For instance, this can occur during deceleration, acceleration, or constant velocity travel of the vehicle 10.

Furthermore, control methods similar to those discussed above can be applied for resisting locking of the wheel assemblies 18a, 18b (i.e., to operate as an anti-lock braking system). For instance, when the reverse voltage is applied to decelerate the motors 50, the controller 30 can compare the operating conditions of the motors 50. Should the operating conditions of one motor 50 fall outside the predetermined range of the other due to a locking condition of one motor 50, then the power can be cut to both for a fraction of a second to unlock the motor 50.

It will be appreciated that this electronic braking system can be an alternative to or in addition to another braking system, such as a hydraulic braking system, mechanical braking system, etc. For instance, as shown in FIG. 12, the vehicle 10 can include a disc brake 92 and calipers 94, which are each operably coupled to the wheel 18a, 18b in a known fashion. The disc brake 92 and calipers 94 can be disposed on either side of the rim 72, adjacent either end cap 80, 82. For instance, in embodiments in which only one end cap 80, 82 is removably coupled to the inner ring portion 76 and the other end cap 80, 82 is integrally connected to the ring portion 76, the disc brake 92 and calipers 94 can be disposed on the side adjacent the removable end cap 80, 82.

The calipers 94 can selectively grip the disc brake 92 when the rider 12 actuates the brake lever (e.g., due to flow of brake fluid, actuation of a cable linkage, etc.) to thereby decelerate the wheel 18a, 18b. Thus, it will be appreciated that the disc brake 92 and calipers 94 can be used in addition to or instead of the electronic braking system discussed above. Moreover, the braking system can brake only one of the wheels 18a, 18b in some embodiments. Also, in some embodiments, only one of the wheels 18a, 18b is equipped for electronic braking while the other wheel 18a, 18b is equipped for hydraulic or mechanical braking. It will be appreciated that the calipers 94 can be actuated without the use of braking fluid and, instead, rely on actuation of mechanical linkages such that the vehicle 10 does not include any on-board brake fluids.

Figure 6:
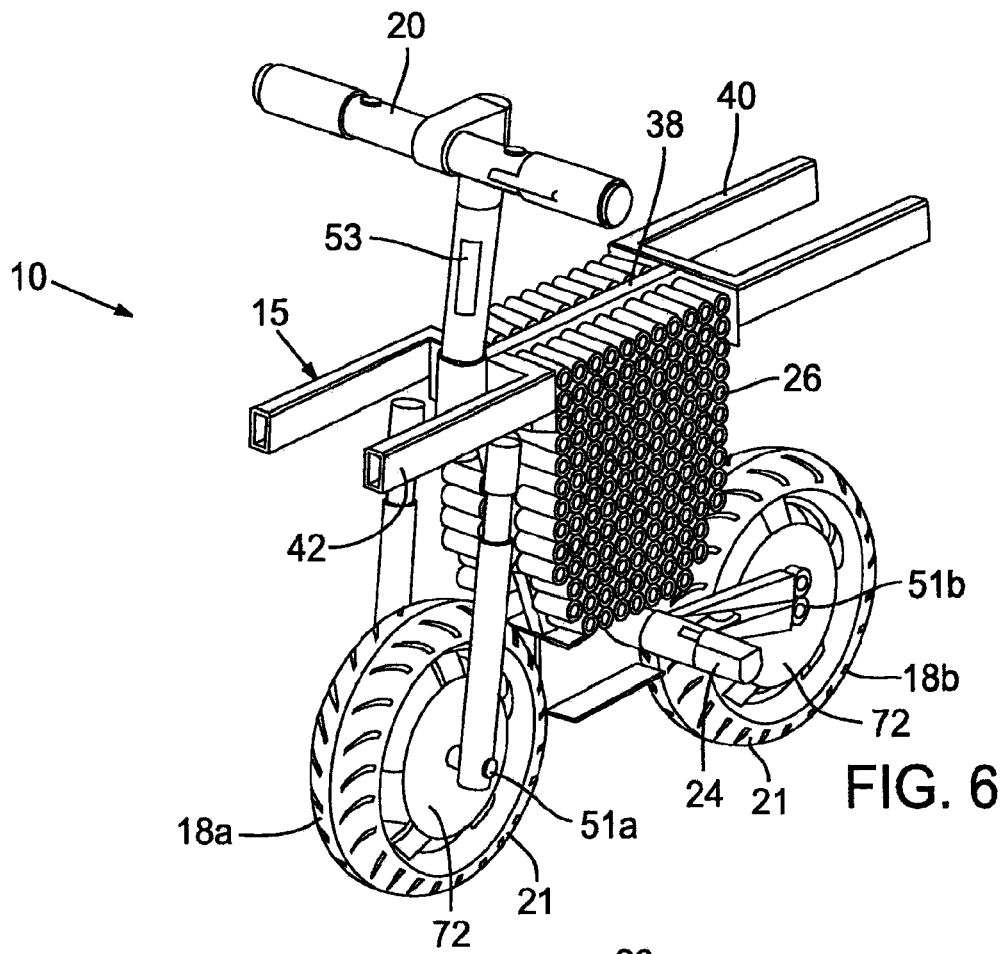
FIG. 6 is a perspective view of the vehicle of FIG. 1 with the outer body panel assembly removed.
Figure 7:
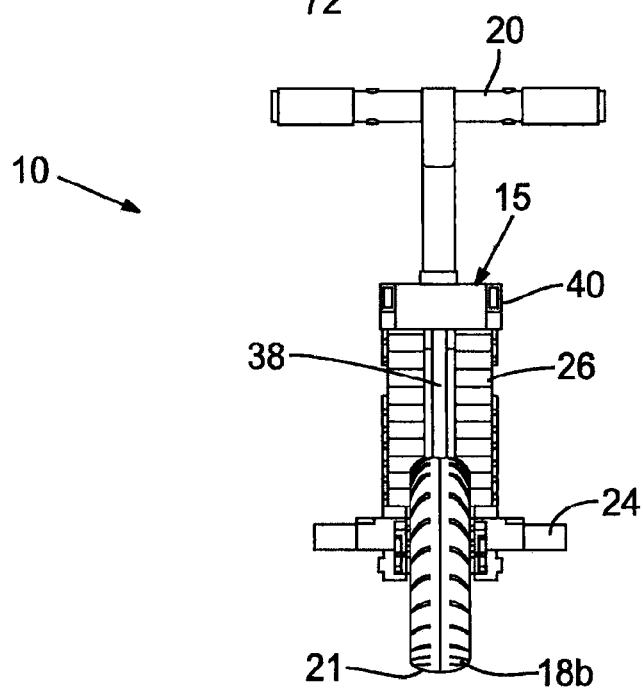
FIG. 7 is a rear view of the vehicle of FIG. 1 with the outer body panel assembly removed.

Referring now to FIG. 10, additional embodiments of an all wheel drive system for the vehicle 10 are illustrated. As shown, the vehicle 10 can include a front wheel sensor 51a, a rear wheel sensor 51b, and a steering angle sensor 53 (FIGS. 6 and 10). These sensors 51a, 51b, 53 can be in communication with the controller 30 (FIG. 10). The sensors 51a, 51b can be of any suitable type, such as a speed sensor, accelerometer, etc. The sensors 51a, 51b can detect one or more various characteristics of the respective wheels 18a, 18b, and the sensors 51a, 51b can transmit correlated signals to the controller 30. Also, the steering angle sensor 53 can determine the turning angle of the front wheel 18a and can transmits correlated signals to the controller 30. The controller 30 can determine how to control the motors 50 of the wheels 18a, 18b based on the input from the sensors 51a, 51b, 53.

For instance, if the steering angle sensor 53 determines that the front wheel 18a is being turned past a threshold turning angle, the controller 30 can transmit control signals to cause each wheel 18a, 18b to be driven at different speeds and to allow the wheels 18a, 18b to travel different distances through the turn. In some embodiments, the controller 30 can refer to a look-up table in the memory module 34 to determine a desired speed differential or ratio of the front and rear wheels 18a, 18b according to the detected turning angle, and the controller 30 can control the speed of the wheels 18a, 18b according to the look-up table. Also, the wheel sensors 51a, 51b can provide the necessary feedback signals to the controller 30 to confirm that the wheels 18a, 18b are rotating at the desired speed ratio.

Furthermore, the controller 30 can rely on the wheel sensors 51a, 51b and voltage differentiation or current regulation (or angular velocity, etc.) to maintain traction control. For instance, if one or both of the wheel sensors 51a, 51b detects that the respective wheel 18a, 18b is slipping, the processor 32 can control the corresponding motor 50 at the wheel 18a, 18b to reduce torque and thereby reduce slippage. Accordingly, the stability of the vehicle 10 can be enhanced or maintained.

Likewise, the controller 30 can similarly rely on the wheel sensors 51a, 51b to detect whether one or more wheels has an excessive amount of torque. For instance, if the rear wheel 18b has excessive amount of torque, the controller 30 can control the rear motor 50b of the rear wheel 18b to reduce torque and substantially reduce the likelihood of the front wheel 18a lifting off the riding surface. Thus, the controller 30 can operate as an electronic anti-wheelie control. Likewise, the controller 30 can operate to reduce the likelihood of the rear wheel 18b lifting off the riding surface. The controller 30 can also automatically adapt to the grade, riding surface, rider position, etc. as discussed above with respect to FIG. 13.

In addition, the controller 30 can control the brakes of the front and rear wheels 18a, 18b independently. For instance, the controller 30 can control the brakes to prevent locking of the respective wheel(s) 18a, 18b.

It will be appreciated that, in some embodiments, the traction control, stability control, and/or antilock braking systems can be realized by monitoring the input and/or output of the motors 50 of each wheel 18a, 18b. For instance, if power output from one motor 50 is outside a predetermined threshold (i.e., indicative of wheel slippage, etc.), then the controller 30 can reduce power to that motor 50 to maintain traction and/or stability of the vehicle. Thus, the all wheel drive capability of the vehicle 10 can allow for simple, efficient, and relatively inexpensive traction control, stability control, braking control, rider and vehicle calibration, and adaptation for different riding surfaces and grades.

As discussed above, the vehicle 10 can be modular and easily reconfigured according to the desires of the rider 12, according to the driving laws of a particular municipality, or for any other reason. For instance, the vehicle 10 can include interchangeable controller assemblies 29 such that the control systems of the vehicle 10 can be upgraded and otherwise changed in a convenient manner. Moreover, other systems of the vehicle 10 can be interchangeable. For instance, the wheels 18a, 18b can be interchanged, the outer body panel assembly 16 can be easily interchanged or replaced, and other features of the vehicle 10 can be interchanged to change the aesthetics of the vehicle 10, to change the riding quality of the vehicle 10, or for any other appropriate reason.

The vehicle 10 can also include a ground lighting system 54 (as shown in FIG. 1). In some embodiments, the ground lighting system 54 can include a row of lights 55 on one or both sides of the vehicle 10, adjacent the foot pegs 24. The lights 55 can project light toward the ground surface on either sides of the vehicle 10 while the vehicle 10 is moving. The projected light can form any shape on the ground surface. For instance, the lights 55 can project a substantially straight line on the respective sides of the vehicle 10, thereby defining a "lane" for the vehicle 10. Accordingly, the "lane" that is projected on the ground surface can demarcate a space or perimeter area in which the vehicle 10 is riding. This can help drivers in surrounding vehicles to avoid the vehicle 10 while moving. Also, the projected light from the ground lighting system 54 can be aesthetically pleasing.

Also, in some embodiments, the vehicle 10 can include various rider detection features. For instance, the handlebars 20 can include various pressure-sensitive sensors or other types of sensors for detecting that the rider 12 is grasping the handlebars 20. In addition, in some embodiments, the foot pegs 24 can include pressure sensors or other sensors for detecting that the rider 12 has placed his or her feet on the foot pegs 24. Likewise, the seat 22 can include pressure sensors or other types of sensors for detecting that the rider 12 is seated on the vehicle 10. Also, these sensors can act as an automatic shutoff for the vehicle 10 if the rider 12 moves away from the vehicle 10 and/or is inadvertently thrown from the vehicle 10. Also, these sensors can be used to verify that the rider 12 is properly positioned on the vehicle 10.

Moreover, these sensors can be user-specific. For instance, the vehicle 10 can include a detection system that detects that a specific rider 12 is riding the vehicle 10 to thereby prevent theft of the vehicle 10. In addition, in some embodiments, the rider 12 can be equipped with a key fob or other identifier that electrically and wirelessly communicates with the vehicle 10, and when the rider 12 with the key fob is within a predetermined perimeter of the vehicle 10, the vehicle 10 can be powered and can be driven.

Moreover, the vehicle 10 can include various other features. For instance, the vehicle 10 can be equipped with a bike lock, a folding seat, an external electrical outlet/charging/vehicle-to-vehicle charging jack, a key lock, and a kickstand. Also, the vehicle 10 can include a kill switch (e.g., a hard wired switch) for overriding and cutting power supplied to the vehicle 10.

In summary, the vehicle 10 can be extremely compact and lightweight, yet the vehicle 10 can be very safe and fun to ride. Also, the vehicle 10 has several modular features, which makes the vehicle very versatile. Additionally, the vehicle 10 can be manufactured efficiently and relatively inexpensively.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A wheel assembly comprising:
   a tire;
   an electrical motor having a stator and a rotor;
   a rim that is encircled by the tire, the rim including a portion that defines a cavity and at least one opening providing access to the cavity, the electrical motor being disposed within the cavity, at least one of the stator and rotor being directly exposed to the rim, the electrical motor operable to drivingly rotate the rim and the tire; and
   at least one cap that is attached to the portion of the rim to cover and close off the at least one opening, the portion of the rim and the at least one cap cooperating to encase the electrical motor.

2. The wheel assembly of claim 1, further comprising an axle, wherein the stator is fixed relative to the axle, and wherein the rotor is fixed directly to an interior surface of the rim.

3. The wheel assembly of claim 2, wherein the rotor includes a permanent magnet that is fixed directly to the interior surface of the rim.

4. The wheel assembly of claim 1, wherein the rotor is integrally connected to the rim so as to be monolithic.

5. The wheel assembly of claim 4, wherein the rim is at least partially made from a magnetic material.

6. The wheel assembly of claim 1, wherein the rim is operable to receive heat from the electrical motor and to transfer the heat to air surrounding the rim.

7. The wheel assembly of claim 1, wherein the portion of the rim is annular and encircles and houses the electrical motor, and wherein the rim further includes a spoke portion that is disposed between the ring portion and the tire.

8. The wheel assembly of claim 1, wherein the portion of the rim is annular, wherein the portion of the rim includes a first opening and a second opening, wherein the at least one cap includes a first end cap and a second end cap, wherein the first end cap covers the first opening, wherein the second end cap covers the second opening, and wherein the portion of the rim, the first end cap, and the second end cap cooperate to encase the electrical motor.

9. The wheel assembly of claim 1, wherein the electrical motor is a brushless DC motor.

10. The wheel assembly of claim 1, wherein the rim is monolithic and weld-free.

11. The wheel assembly of claim 1, wherein the rim is made of at least one of an Aluminum material and an Aluminum alloy material.

12. The wheel assembly of claim 1, wherein the electrical motor is a direct drive motor that directly drives the rim and the tire in rotation.

13. A wheel assembly for a two wheeled vehicle having a controller, the wheel assembly comprising:
    a tire;
    an electrical motor having a stator and a rotor, the electrical motor configured to be controlled by the controller;
    an axle that supports one of the stator and the rotor;
    a communication line that is configured to provide electrical communication between the controller and the one of the stator and the rotor, at least a portion of the communication line attached to and extending along the axle; and
    a rim that is encircled by the tire and that is rotatably attached to the axle, the other of the stator and the rotor being supported by the rim, both the stator and the rotor being housed by the rim, the electrical motor operable to drivingly rotate the rim and the tire.

14. The wheel assembly of claim 13, wherein the stator is fixed relative to the axle, and wherein the rotor is fixed directly to an interior surface of the rim.

15. The wheel assembly of claim 14, wherein the rotor includes a permanent magnet that is fixed directly to the interior surface of the rim.

16. The wheel assembly of claim 13, wherein the rim is operable to receive heat from the electrical motor and to transfer the heat to air surrounding the rim.

17. The wheel assembly of claim 13, wherein the rim includes an inner ring portion that encircles and houses the electrical motor, an outer ring portion that encircles the inner ring portion, and a spoke portion that extends radially between both the inner and outer ring portions.

18. The wheel assembly of claim 13, wherein the rim includes a portion that defines a cavity, wherein the electrical motor is disposed within the cavity, wherein the portion of the rim includes at least one opening, wherein the rim also includes at least one cap that is fixed to the portion of the rim to cover and close off the at least one opening, wherein the portion of the rim and the at least one cap cooperate to encase the electrical motor.

19. The wheel assembly of claim 13, wherein the electrical motor is a brushless DC motor.

20. A two wheeled vehicle having a first wheel assembly and a second wheel assembly, the vehicle also including a controller, each of the first and second wheel assemblies comprising:
 a tire;
 an axle defining an axis of rotation;
 an electrical motor having a stator and a rotor, the stator being fixed relative to the axle;
 a communication line that is configured to provide electrical communication between the controller and the stator, at least a portion of the communication line attached to and extending along the axle; and
 a rim that is encircled by the tire, the rim having an inner portion that defines an interior space and at least one opening, the electrical motor being received within the interior space of the inner portion such that the rotor is fixed directly to an interior surface of the inner portion, the electrical motor drivingly rotating the rim and the tire about the axis of rotation; and
 at least one end cap that is fixed to the inner portion of the rim to cover and close off the at least one opening, the stator being directly exposed to the end cap, the inner portion of the rim and the at least one end cap cooperating to encase the stator and the rotor.

* * * * *